No. 736,064.

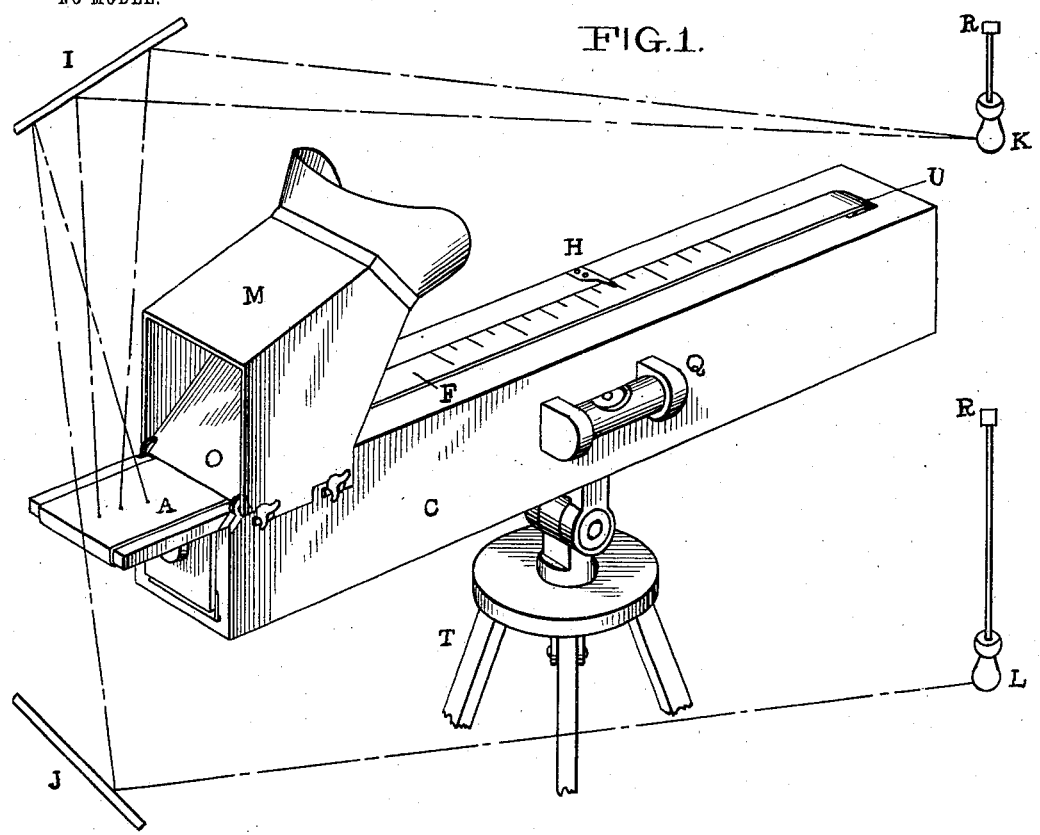
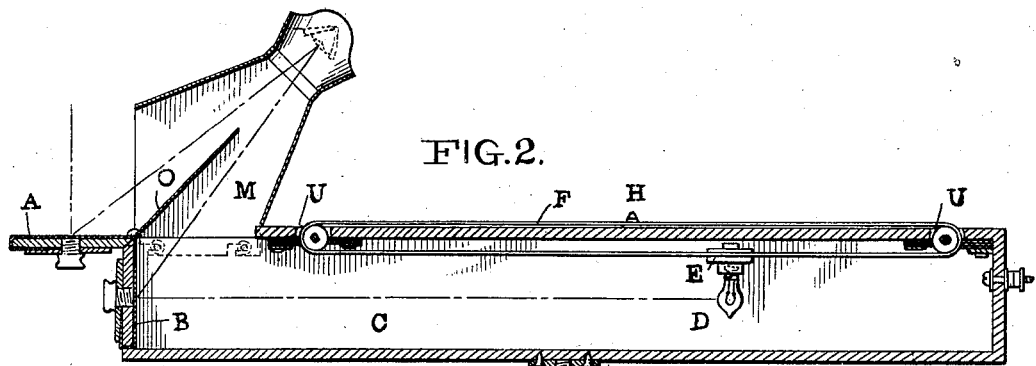

Patented August 11, 1903.

UNITED STATES PATENT OFFICE.

DOUGLASS BURNETT, OF BROOKLYN, NEW YORK.

METHOD OF MEASURING ILLUMINATION.

SPECIFICATION forming part of Letters Patent No. 736,064, dated August 11, 1903.

Application filed March 4, 1903. Serial No. 146,140. (No model.)

*To all whom it may concern:*

Be it known that I, DOUGLASS BURNETT, a citizen of the United States of America, and a resident of Brooklyn, in the county of Kings and State of New York, have invented certain new and useful Improvements in Methods of Measuring Illumination, of which the following is a specification.

My invention as herein set forth relates to a process for measuring the amount of general lighting as distinguished from the measurement of an individual lamp or source of light.

Human occupations, such as reading or manufacturing, require a certain minimum "quantity of light," which is furnished either by natural sources—as, for instance, the direct light of the sun—or artificially by lamps of various sorts, and the action of these lights is usually complicated by phenomena of diffusion from the walls of buildings or the walls, ceilings, and objects in a room. Furthermore, artificial lighting is often directed and diffused for useful purposes by means of more or less translucent shades or globes, scattering a number of lamps through a room, or in some cases the sources of light are actually hidden behind cornices or other opaque bodies.

The problem I have solved is independent of the measuring of the intensity or candle-power of any one or more of the lights. I secure a direct measurement or indication of the amount of light in any place. This amount of light is a function (*a*) of the intensity of each individual source of light, (*b*) of the number of lights, (*c*) of their location—that is, their distance from any object lighted—(*d*) of the reflecting and diffusing quality of neighboring objects, and (*e*) the extent to which the light is absorbed in passing through globes or shades. In practice these disturbing elements are so variable that it is difficult or impossible to estimate the quantity of light in any but the most simple cases, though we have a unit, in terms of which the quantity of light may be expressed. This is the candle-foot or lux, which is the amount of light on a surface at a distance of one foot from a light of one-candle-power intensity, and when there is no reflection, diffusion, or loss in transmission between the source of light and the surface illuminated the amount of light—that is, the $$\text{Number of luces} = \frac{\text{intensity}}{(\text{distance})^2}$$

when intensity is reckoned in candle-power and distance in feet.

The lux is, as well known to those skilled in the art, the current standard of illumination and is distinguished from the unit of light proper in the manner just indicated.

My process consists in illuminating a surface by the light the amount of which is to be determined and by visual perception making equal to it the illumination on a similar surface by lighting it directly by means of a standard light at a measurable distance from the second surface and then determining the number of luces or the amount of light by means of the formula just given. The standard light and the second surface which it illuminates are inclosed in a box, the interior of which is made non-reflecting, for the purposes of shielding the surface from any extraneous light, and any slight reflection may be determined by calibration of the instrument on an ordinary photometer.

The device embodying the invention for carrying out the process is described in detail in the accompanying drawings.

Figure 1 is a perspective view of the device and such apparatus as is necessary for explaining the nature of the operation. Fig. 2 is a sectional view of the device, embodying a modification.

A is a photometer-screen, and B is another photometer-screen, the two being shown at right angles to each other and located the latter across the end of the lamp-box C, containing a standard lamp D, carried by a movable support E inside of the box C and having a belt F on the outside of the box C, and a scale carried by the belt for pointing out the location of the lamp with respect to the pointer H on the outside of the box C. This scale enables one to read the number of luces illuminating the screen A, which faces the general lighting, such as the objects or walls of a room or lamps contained therein. Such objects are typically represented by diffusing-screens I and J for the lamps K and L. The screen A stands at the open end of the eye-box M in the line of sight of an observer looking into the other end of the eye-box M. When one looks into the eye-box M, he sees simultaneously the photometer-screens A and B, which should preferably be white, while the internal walls of the tubes M and C should be black, all for obvious reasons.

It is preferable to provide an opaque screen O, extending into the eye-box from the juncture of the screens A and B, to prevent the outside light from entering the box C and thereby interfering with the efficiency of the instrument.

The operation consists in placing the device so that ordinary light, the amount of which is sought to be determined, shall fall upon the screen A. The operator places his eye at the upper end of the box M and looks simultaneously at the screens A and B and then moves the belt F back and forth until the luminosity of the screens A and B appears uniform. He then reads the scale H, and thereby knows the number of luces on the screen A. To obtain an average, if desired, the device may be turned in different directions on the tripod T and readings taken as before. Accordingly the instrument may be employed in meteorology or for scientific purposes. For example, it may be so located that the screen A faces the sky and out of direct sunlight, and thereby the luminosity of the sky on different days and under variations of the weather may be determined. Similarly the lighting effect of the sun itself may be determined.

A spirit-level Q may be applied to the instrument for convenience in cases where it is desirable that the lamp D may be movable in a horizontal plane.

R represents supports for the lamps K and L. The screens A and B are shown at an angle to each other, and the opaque screen O extends from the juncture of the photometer screens A and B. It is found that when one looks into the box M the screen O will remain practically unnoticed, while both of the screens will be distinctly visible, and any difference in their luminosity will be easily discernible.

U represents a slot through one side of the box C, so that the belt may pass through the slot and support the lamp D.

The elements I and J are light-diffusing objects and are stationary and are supposed to be so located as to directly or indirectly reflect more or less of the light from the lamps K and L to the screen A. They may either represent the walls of a room or stationary objects in the room or sky or they may be provided as a portion of the apparatus and may be placed at different relative positions and angles with respect to the screen A.

As arranged in the drawings the eye and lamp boxes M and C serve to cut off the light of the lamps K and L from the screen A in cases where only diffused light is to be measured.

I claim as my invention—

1. The herein-described method of measuring illumination, consisting in receiving the illumination at any given point on an opaque diffusing-surface, illuminating a comparison diffusing-surface by a known source of direct light, equalizing the illumination of the last-named surface with the first, and indicating the number of luces produced on said second screen by said direct light.

2. The herein-described method of measuring illumination, consisting in exposing an opaque diffusing-surface at the point to be measured to the illumination of diffused light, illuminating a comparison opaque diffusing-surface by a standard source of direct light only, equalizing the illumination of said surface with that of the first, by varying the distance of said direct light from said second surface, and indicating in luces, the distance of said direct light from said second surface.

In testimony whereof I have hereunto set my hand and seal this 27th day of February, 1903.

DOUGLASS BURNETT. [L. S.]

Witnesses:
CHARLES H. B. CHAPIN,
H. R. NELSON.